(12) United States Patent
Matsuda

(10) Patent No.: US 7,424,569 B2
(45) Date of Patent: Sep. 9, 2008

(54) DATA TRANSFER CONTROL DEVICE AND ELECTRONIC EQUIPMENT

(75) Inventor: Kuniaki Matsuda, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 675 days.

(21) Appl. No.: 10/989,365

(22) Filed: Nov. 17, 2004

(65) Prior Publication Data
US 2005/0138446 A1 Jun. 23, 2005

(30) Foreign Application Priority Data
Nov. 18, 2003 (JP) ............................. 2003-388045

(51) Int. Cl.
*G06F 13/00* (2006.01)
*G06F 1/00* (2006.01)
(52) U.S. Cl. ...................................... 710/316; 713/340
(58) Field of Classification Search ................. 710/305, 710/316; 713/310, 340
See application file for complete search history.

(56) References Cited

U.S. PATENT DOCUMENTS

| | | | | |
|---|---|---|---|---|
| 6,147,682 | A * | 11/2000 | Kim ............................. | 345/211 |
| 6,363,491 | B1 * | 3/2002 | Endo ........................... | 713/310 |
| 6,516,205 | B1 * | 2/2003 | Oguma ........................ | 455/557 |
| 6,671,814 | B1 * | 12/2003 | Kubo et al. .................. | 713/324 |
| 6,774,604 | B2 | 8/2004 | Matsuda et al. | |
| 6,963,933 | B2 * | 11/2005 | Saito et al. ...................... | 710/1 |
| 7,154,553 | B2 | 12/2006 | Horii et al. | |
| 7,159,132 | B2 | 1/2007 | Takahashi et al. | |
| 2002/0167851 | A1 | 11/2002 | Ishida et al. | |
| 2005/0158065 | A1 * | 7/2005 | Matsuda ....................... | 399/66 |

FOREIGN PATENT DOCUMENTS

| | | |
|---|---|---|
| JP | A-2002-95181 | 3/2002 |
| JP | A-2002-237972 | 8/2002 |
| JP | A 2002-344537 | 11/2002 |
| JP | A-2003-263245 | 9/2003 |

OTHER PUBLICATIONS

USB On-The-Go A Tutorial, Philips Corporation.*
USB On-The-Go A Tutorial, Philips Corporation, Jan. 2002.*

* cited by examiner

*Primary Examiner*—Khanh Dang
(74) *Attorney, Agent, or Firm*—Oliff & Berridge, PLC

(57) ABSTRACT

Aspects of the invention can provide a data transfer control device and electronic equipment that can achieve to switch supplying power through a VBUS. The transfer controller can transmit a switching request packet of supplying power through a VBUS to a type-B plug connected side (a type-B device side). In the case when the transfer controller can receive a switching acknowledgment packet of supplying power through the VBUS, the transfer controller can instruct a power supply switching circuit to stop a power supply through the VBUS. A monitoring the voltage level of the VBUS can be stopped before stopping the power supply through the VBUS. A transfer controller can receive the switching request packet of supplying power through the VBUS from the type-A plug connected side (a type-A device side). In the case when the transfer controller acknowledges the switching, the transfer controller can transmit the switching acknowledgment packet of supplying power through the VBUS, and instructs the power supply switching circuit to start supplying power through the VBUS. The monitoring the voltage level of the VBUS can be stopped before starting the power supply through the VBUS. The switching request packet and switching acknowledgment packets can be transmitted using a control transfer.

16 Claims, 11 Drawing Sheets

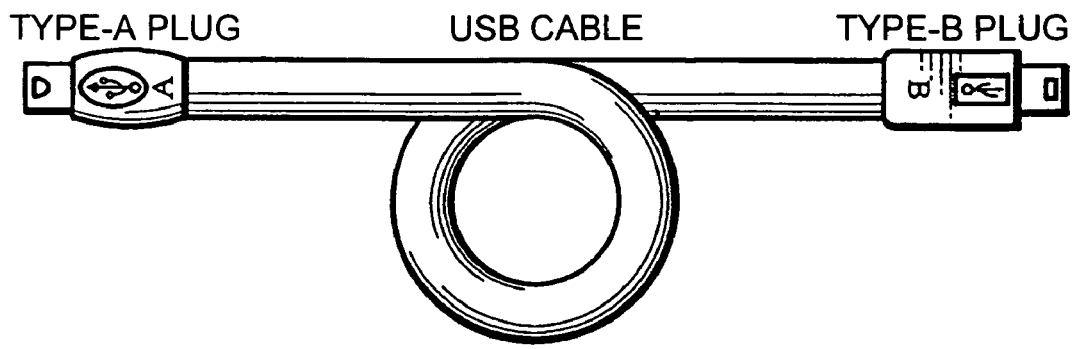
FIG. 1A
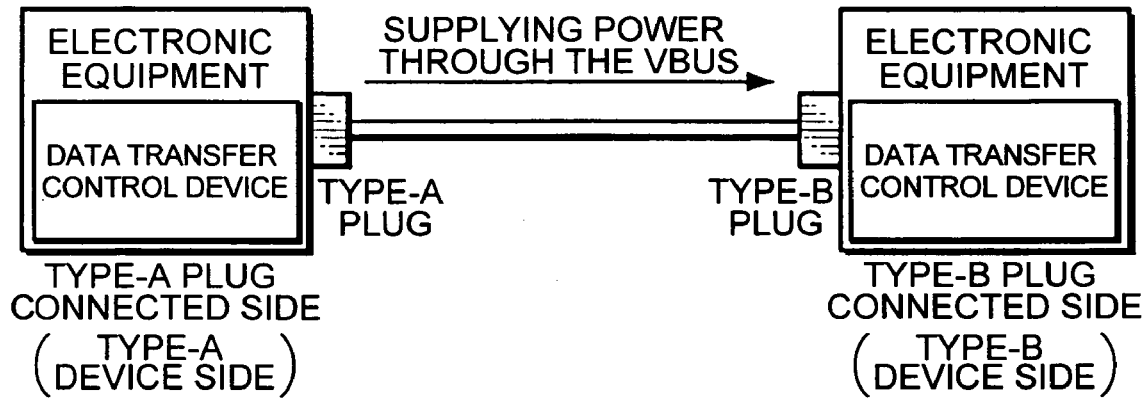
FIG. 1B
| PIN NUMBER | SIGNAL NAME |
|---|---|
| 1 | VBUS |
| 2 | D− |
| 3 | D+ |
| 4 | ID |
| 5 | GND |
FIG. 1C

DATA TRANSFER CONTROL DEVICE AND ELECTRONIC EQUIPMENT

BACKGROUND OF THE INVENTION

1. Field of Invention

Aspects of the invention can relate to a data transfer control device and electronic equipment.

2. Description of Related Art

The related art universal serial bus (USB) standard attracts attention as an interface standard for connections between personal computers and electronic equipment (peripheral equipment). The USB can be characterized in that it has power lines, so-called VBUS line, in addition to data lines. The USB standard also has a requirement that the side to which a type-A plug is connected supplies power using the VBUS line.

However, portable electronic equipment, such as cellular phones, are generally operated by batteries. Therefore, taking into consideration the consumption of the battery, it is not preferable that portable electronic equipment performs supplying power even though the type-A plug is connected to the portable electronic equipment. See, for example, Japanese Unexamined Patent Publication No. 2002-344537.

SUMMARY OF THE INVENTION

Aspects of the invention can provide a data transfer control device and electronic equipment that can achieve to switch supplying power through the VBUS.

A data transfer control device for transferring data through the USB of a first aspect of the invention can include a transfer controller controlling a data transfer, and a power supply switching circuit controlling a switching of supplying power to a VBUS line of the USB. In the case in which the data transfer control device is a first data transfer control device connected to a type-A plug side of the USB that supplies power to the VBUS, the transfer controller transmits a switching request packet of supplying power to the VBUS to a second data transfer control device connected to a type-B plug side and instructs the power supply switching circuit to stop supplying power to the VBUS, if the transfer controller receives a switching acknowledgment packet of supplying power to the VBUS from the second data transfer control device connected to the type-B plug side.

In the first aspect of the invention, the packet to request the switching of supplying power to the VBUS is transmitted to the second data transfer control device (transfer controller) at the type-B plug connected side. Then, if the switching acknowledgment packet of supplying power to the VBUS is received from the second data transfer control device at the type-B plug connected side, the power supply to the VBUS supplied by the power supply switching circuit connected to the type-A plug side is stopped. In this way, the power supply to the VBUS can be switched from the type-A plug connected side to the type-B plug connected side. Therefore, for example, in a case when electronic equipment at the type-A plug connected side is operated by a battery, and electronic equipment at the type-B plug connected side is operated by an AC power supply, it is possible to suppress the running out of the battery power in electronic equipment at the type-A plug connected side and improve user convenience. Here, the first data transfer control device connected to the type-A plug side can mean that the data transfer control device included in electronic equipment to which the type-A plug is connected. The second data transfer control device connected to the type-B plug means that the data transfer control device included in electronic equipment to which the type-B plug is connected. In addition, the data transfer control device transferring data in accordance with the USB standard or so-called USB on-the-go (OTG) can be used.

Also, the data transfer control device may include a monitoring circuit monitoring a voltage level on the VBUS. The transfer controller may instruct the monitoring circuit to stop monitoring the voltage level on the VBUS before instructing the power supply switching circuit to stop supplying power to the VBUS. In other words, if the type-A plug connected side stops supplying power to the VBUS in order to switch supplying power to the VBUS (right to supply power to the VBUS), there is a potential case in which an abnormal state of the voltage level of the VBUS is mistakenly detected by the monitoring circuit during period until the type-B plug connected side normally starts supplying power to the VBUS. The data transfer control device can avoid such case.

Also, the transfer controller may instruct the power supply switching circuit to stop supplying power to the VBUS and then perform a waiting process. Subsequently, the transfer controller may instruct the monitoring circuit to resume monitoring the voltage level on the VBUS. In this way, the power supply to the VBUS performed by the type-B plug connected side can be monitored properly using the monitoring circuit at the type-A plug connected side after waiting until the voltage level on the VBUS is stabilized by the power supply to the VBUS supplied from the type-B plug connected side.

In addition, in a case in which the second data transfer control device connected to the type-B plug side supplies power to the VBUS, the transfer controller may transmit a stop order packet of supplying power to the VBUS to the second data transfer control device connected to the type-B plug side and instruct the power supply switching circuit to resume supplying power to the VBUS in a case when a stoppage of supplying power to the VBUS from the data transfer control device connected to the type-B plug side is instructed by an upper layer or in a case when the voltage level on the VBUS is smaller than an operation active voltage level. In this way, in case of an instruction from an upper layer, such as application programs or firmware controlling the data transfer control device or the like, or in a case when the voltage level on the VBUS becomes an abnormal state, the power supply to the VBUS from the type-B plug connected side can be stopped and the power supply to the VBUS can be resumed by the power supply switching circuit connected to the type-A plug side.

Also, the data transfer control device may include a monitoring circuit monitoring a voltage level on the VBUS. The transfer controller may instruct the monitoring circuit to stop monitoring the voltage level on the VBUS before instructing the power supply switching circuit to resume supplying power to the VBUS. In this way, the monitoring the voltage level on the VBUS is stopped before resuming supplying power to the VBUS. This makes it possible to prevent the abnormal state of the voltage level on the VBUS from being mistakenly detected.

Also, the transfer controller may instruct the power supply switching circuit to resume supplying power to the VBUS and then perform a waiting process. Subsequently, the transfer controller may instruct the monitoring circuit to resume monitoring the voltage level on the VBUS. In this way, the monitoring of the voltage level on the VBUS is resumed after the waiting process. This makes it possible to correctly monitor whether or not the type-A plug connected side normally performs supplying power to the VBUS.

Also, the transfer controller may transmit the switching request packet using a control transfer based on the USB specification. In addition, the switching request packet may be transmitted using other transmission methods in addition to the control transfer.

A data transfer control device for transferring data through the USB of a second aspect of the invention can include a transfer controller controlling a data transfer, and a power supply switching circuit controlling a switching of supplying power to a VBUS line of the USB. In a case in which the data transfer control device is a second data transfer control device connected to a type-B plug side of the USB and a first data transfer control device at a type-A plug connected side supplies power to the VBUS, the transfer controller receives a switching request packet of supplying power to the VBUS from the first data transfer control device at the type-A plug connected side and transmits a switching acknowledgment packet to the first data transfer control device connected to the type-A plug side and instructs the power supply switching circuit to start supplying power to the VBUS in a case of acknowledging the switching.

In the second aspect of the invention, the switching request packet of supplying power to the VBUS is received from the first data transfer control device (transfer controller) connected to the type-A plug side. In a case of acknowledging the switching, the switching acknowledgment packet of supplying power to the VBUS is transmitted to the first data transfer control device (transfer controller) at the type-A plug connected side. Then, the power supply to the VBUS is started by the power supply switching circuit connected to the type-B plug connected side. In this way, the power supply to the VBUS can be switched from the type-A plug connected side to the type-B plug connected side by a negotiation. Therefore, for example, in a case when electronic equipment at the type-A plug connected side is operated by a battery, and electronic equipment at the type-B plug connected side is operated by an AC power supply, it is possible to suppress the running of the battery in electronic equipment at the type-A plug connected side and improve user convenience.

Also, the data transfer control device may include a monitoring circuit monitoring a voltage level on the VBUS. The transfer controller may instruct the monitoring circuit to stop monitoring the voltage level on the VBUS before instructing the power supply switching circuit to start supplying power to the VBUS. In this way, the monitoring the voltage level of the VBUS is stopped before starting the power supply to the VBUS. This makes it possible to prevent or reduce the abnormal state of the voltage level on the VBUS from being mistakenly detected.

Also, the transfer controller may instruct the power supply switching circuit to start supplying power to the VBUS and then perform a waiting process. Subsequently, the transfer controller may instruct the monitoring circuit to resume monitoring the voltage level on the VBUS. In this way, the monitoring of the voltage level on the VBUS is resumed after the waiting process. This makes it possible to correctly monitor whether or not the type-B plug connected side normally performs supplying power to the VBUS.

Also, in a case when the data transfer control device is the second data transfer control device at the type-B plug connected side that supplies power to the VBUS, the transfer controller instructs the power supply switching circuit to stop supplying power to the VBUS in a case when a stop order packet of supplying power to the VBUS is received from the first data transfer control device connected to the type-A plug side, or a voltage level on the VBUS is smaller than an operation active voltage level. In this way, the power supply to the VBUS performed by the type-B plug connected side can be stopped in a case when the stop order packet of supplying power to the VBUS is received or the voltage level on the VBUS becomes abnormal.

Also, the data transfer control device may include a monitoring circuit monitoring a voltage level on the VBUS. The transfer controller may instruct the monitoring circuit to stop monitoring the voltage level on the VBUS before instructing the power supply switching circuit to stop supplying power to the VBUS. In this way, the monitoring the voltage level of the VBUS is stopped before stopping the power supply to the VBUS. This makes it possible to prevent or reduce the abnormal state of the voltage level of the VBUS from being mistakenly detected.

Also, the transfer controller may instruct the power supply switching circuit to stop supplying power to the VBUS and then perform a waiting process. Subsequently, the transfer controller may instruct the monitoring circuit to resume monitoring the voltage level on the VBUS. In this way, the monitoring of the voltage level of the VBUS is resumed after the waiting process. This makes it possible to correctly monitor whether or not the type-A plug connected side normally performs the power supply to the VBUS.

Also, the transfer controller may transmit the switching acknowledgment packet using a control transfer based on the USB specification. In addition, the switching acknowledgment packet may be transmitted using other transmission methods in addition to the control transfer. In addition, electronic equipment of a third aspect of the invention includes any of the above-mentioned data transfer control devices and a processing unit controlling any of the data transfer control devices.

BRIEF DESCRIPTION OF THE DRAWINGS

The invention will be described with reference to the accompanying drawings, wherein like numerals reference like elements, and wherein:

FIGS. 1(A), (B), and (C) are diagrams to explain a type-A plug and a type-B plug of the USB;

DETAILED DESCRIPTION OF PREFERRED EMBODIMENTS

An exemplary embodiment according to the invention will be explained below in detail. It should be understood that the exemplary embodiment explained below should not be construed in any way to unduly limit the contents of the exemplary invention described in the claims, and all of the configurations explained in the embodiment are not indispensable.

1. Type-A Plug and Type-B Plug

A type-A plug and a type-B plug (a first plug and a second plug) that are shown in FIG. 1(A) are defined as a standard for connectors in the USB. Also, a type-A receptacle configured to enable the type-A plug to be inserted, and a type-B receptacle configured to enable the type-B plug to be inserted are defined. In addition, in order to miniaturize connectors, a Mini-A plug, a Mini-B plug, a Mini-A receptacle, and a Mini-B receptacle are defined. Further, in the USB on-the-go (OTG) that enables peripherals (USB devices) to have a simplified host function, a Mini-AB receptacle configured to enable both the Mini-A plug and Mini-B plug to be inserted is defined.

In the USB, the side to which the type-A plug (Mini-A plug) is connected supplies power to the type-B plug connected side through the VBUS. Thus, in FIG. 1(B), electronic equipment (data transfer control device) at the side to which the type-A plug connected (hereinafter referred to as type-A plug connected side) supplies power through VBUS to electronic equipment (data transfer control device) at the side to which the type-B plug connected (hereinafter referred to as type-B plug connected side).

In the USB, the type-A plug is connected to a host (USB host) and the type-B plug is connected to a USB device (peripheral). Alternatively, in the OTG, the type-A plug connected side is called a type-A device, and the type-B plug connected side is called a type-B device. While the type-A device and type-B device play a role of the host and peripheral, respectively, in the default condition, the role of the host and peripheral can be interchanged using a host negotiation protocol (HNP). Therefore, this makes it possible that the type-A device connected to the type-A plug plays a role of the peripheral and the type-B device connected to the type-B plug plays a role of the host. So-called dual-role device can be achieved.

Also, in the OTG, an ID terminal is defined in addition to the terminals VBUS, D+, D−, and GND as shown in FIG. 1(C) in order to identify the type of the plug inserted into the Mini-AB receptacle. In the Mini-A plug, the ID terminal is connected to the GND terminal. In the Mini-B plug, the ID terminal is opened. Thus, whether the plug inserted into the Mini-AB receptacle is the Mini A plug or Mini-B plug can be identified using the ID terminal.

2. Negotiation to Switch Supplying Power Through the VBUS.

Figure 2A:
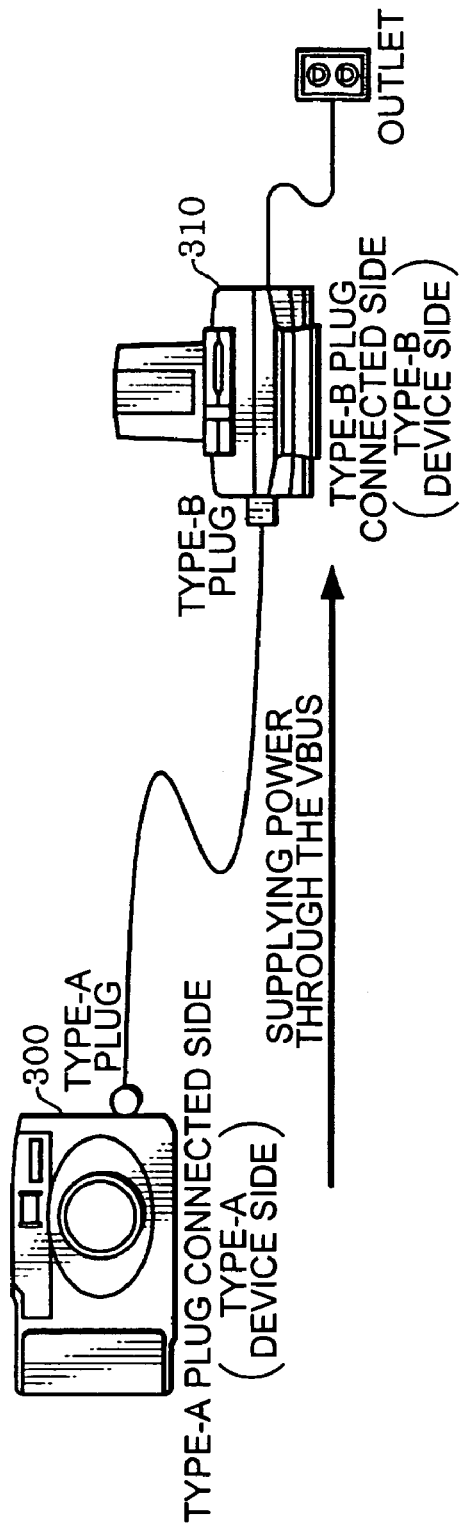
FIGS. 2(A) and (B) are diagrams explaining a method of switching for supplying power through the VBUS of an exemplary embodiment of the present invention.

As above-mentioned, the USB standard has the requirement that the type-A plug connected side supplies power to the type-B plug connected side through the VBUS. For example, as shown in FIG. 2(A), a digital camera 300 as the portable electronic equipment typically includes the USB type-A receptacle (Mini-A receptacle or Mini-AB receptacle), the type-A plug of the USB cable being connected. In contrast, some electronic equipment, such as a printer 310 or the like, typically include the USB type-B receptacle, the type-B plug of the USB cable being connected. Accordingly, in this case, the digital camera 300 at the type-A plug connected side (type-A device side) has to perform a VBUS power supply (supply power through the VBUS line) to the printer 310 at the type-B plug connected side (type-B device side).

However, if the digital camera 330 side performs the VBUS power supply, its battery can be rapidly drained because the battery normally drives the digital camera 300, thereby hampering user convenience. In contrast, the printer 310 has not much problem performing the VBUS power supply because the printer 310 includes an AC power supply.

Figure 2B:
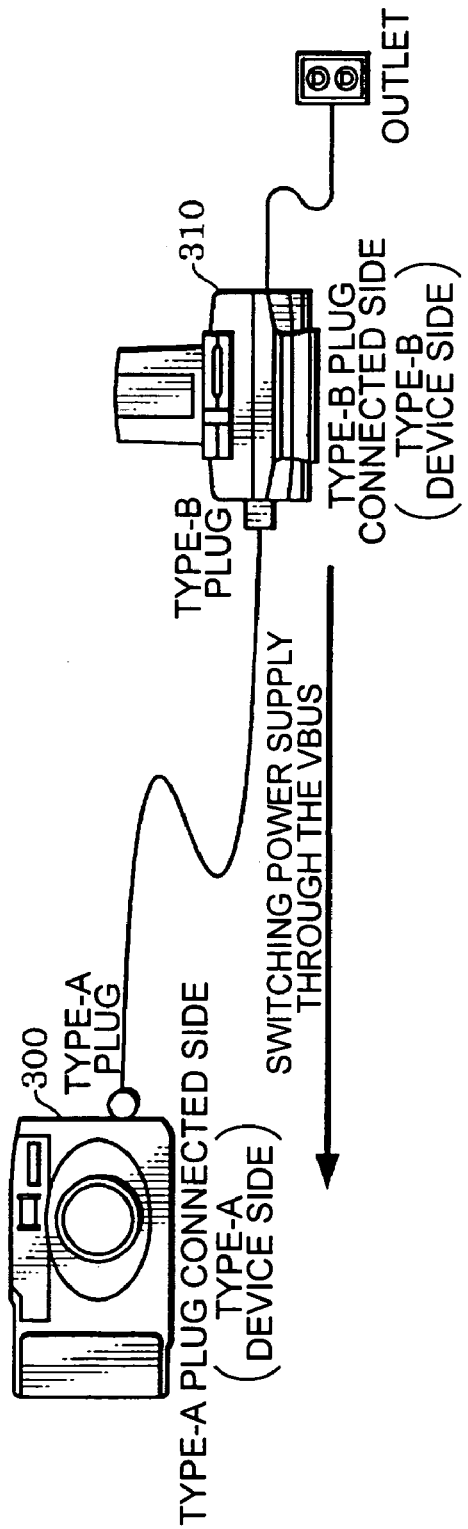

Thus, in this exemplary embodiment, a method in which the side performing the VBUS power supply is determined by a negotiation to be switched is adopted. In other words, if application programs, firmware or the like instruct a negotiation to switch the VBUS power supply, the negotiation starts to determine which side, the type-A plug connected side or the type-B plug connected side, performs the VBUS power supply. Then, the side that performs the VBUS power supply is determined by this negotiation, the determined side performing the power supply through the VBUS. In this way, as shown in FIG. 2(B), the printer 310 including the AC power supply can perform the VBUS power supply to the digital camera 300. This makes it possible the running out of the battery power of the digital camera 300 to be suppressed.

3. Configuration

Figure 3:
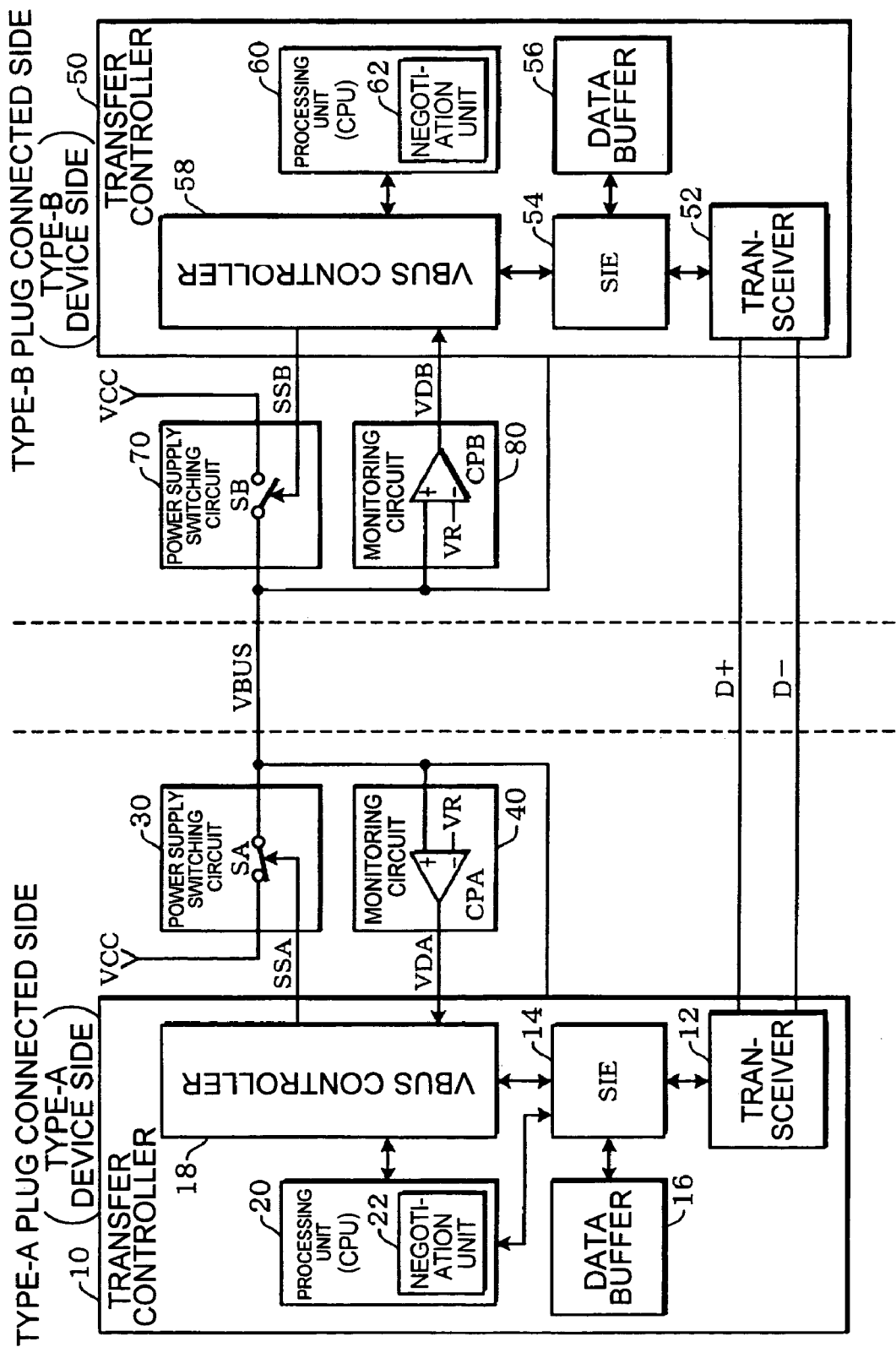
FIG. 3 shows an exemplary of the configuration of a data transfer control device of the exemplary embodiment.

FIG. 3 shows an example of the configuration of a data transfer control device that can embody the method of the exemplary embodiment. A data transfer control device (data transfer control device included in electronic equipment connected to the type-A plug) at the type-A plug connected side (type-A device side) includes a transfer controller 10, a power supply switching circuit 30, and a monitoring circuit 40. Here, the transfer controller 10, which controls data transfer through the USB, includes a transceiver 12, a serial interface engine (SIE) 14, a data buffer 16, a VBUS controller 18, and a processing unit 20 (CPU). A configuration in which a part of these function (circuit) blocks is omitted can be used.

The transceiver 12 is a circuit that receives and transmits the data of the USB using differential data signals D+ and D−, and can include a physical layer circuit of the USB. More specifically, the transceiver 12 produces a line state of D+ and D− (J, K, SE0, and the like), and performs a serial/parallel converting, parallel/serial converting, bit stuffing, bit unstuffing, NRZI decoding, NRZI encoding, and the like.

The SIE 14 is a circuit that can perform various kinds of processing for packet transfer of the USB. The SIE 14 can include a packet handler circuit, suspend & resume control circuit, a transaction control circuit, etc., that are not shown.

The data buffer 16 is a buffer (FIFO) in which the data (transmitting data or receiving data) transferred through the USB is temporary stored (buffering). The data buffer 16 can be configured with memories such like a random access memory (RAM), etc.

The VBUS controller 18 is a controller to monitor the VBUS power supply or the voltage level of the VBUS. Specifically, the VBUS controller 18 controls the VBUS power supply performed by the power supply switching circuit 30 and the monitoring of the voltage of the VBUS performed by the monitoring circuit 40.

The processing unit 20 (CPU) controls each circuit block in the transfer controller 10 and performs software processing for data transfer control. The processing unit 20 includes a negotiation unit 22 performing a negotiation to switch the VBUS power supply. The function of the negotiation unit 22 is realized by hardware such like a CPU (processor), etc., and software such like firmware or application programs, etc.

The power supply switching circuit 30 can control the switching to supply power to the VBUS line. Specifically, the power supply switching circuit 30 can include a switching element SA configured by transistors and the like. If the switching signal SSA from the VBUS controller 18 becomes active, the switching element SA turns on such that the power supply VCC is connected to the VBUS line. This leads to start the VBUS power supply from the VCC. In contrast, if the switching signal SSA becomes inactive, the switching element SA turns off such that the connection between the power supply VCC and the VBUS line is blocked. This leads to stop the VBUS power supply from VCC. Both the battery (rechargeable battery) and the AC power supply can be used as the power supply VCC.

The monitoring circuit 40 can monitor a voltage level of the VBUS. Specifically, the monitoring circuit 40 includes a comparator CPA. The comparator CPA compares the voltage level of the VBUS with a reference voltage level VR (operation active voltage level, for example, 4.4 V). If the voltage level of the VBUS voltage level is lower than the VR, the comparator CPA causes a detection signal VDA to be active.

For example, in the USB (OTG), the voltage level of the VBUS has to be maintained in the range from 4.4 V to 5.25 V for the low power device having low supply capacity of current. Also, the voltage level of the VBUS has to be maintained in the range from 4.75 V to 5.25 V for the high power device having high supply capacity of current. Accordingly, since the condition in which the voltage level of the VBUS is smaller than 4.4 V (operation active voltage level) is, anyhow, an abnormal state, the monitoring circuit 40 monitors the voltage level of the VBUS to detect the abnormal state so as to cause the detection signal VDA to be active.

A data transfer control device (data transfer control device included in electronic equipment connected to the type-B plug) at the type-B plug connected side (type-B device side) can include a transfer controller 50, a power supply switching circuit 70, and a monitoring circuit 80. In addition, the transfer controller 50 includes a transceiver 52, a SIE 54, a data buffer 56, a VBUS controller 58, and a processing unit (CPU) 60. A configuration in which a part of these function (circuit) blocks is omitted can be used. The transfer controller 50, the transceiver 52, the SIE 54, the data buffer 56, the VBUS controller 58, the processing unit 60, the power supply switching circuit 70, the monitoring circuit 80 and the like in the type-B plug connected side are nearly same as the transfer controller 10, the transceiver 12, the SIE 14, the data buffer 16, the VBUS controller 18, the processing unit 20, the power supply switching circuit 30, the monitoring circuit 40 and the like in the type-A plug connected side in the configuration and operation excluding the negotiation process or the like, so that the explanations for those in the side to which the type-B is connected will be omitted.

If the data transfer control device in the type-A plug connected side or the type-B plug connected side is performed in accordance with the OTG standard of the USB, the following controllers are included in the data transfer control device. They are: a state controller controlling a plurality of states including a host operation state to operate a role of a host, and a peripheral operation state to operate a role of a peripheral; a host controller performing a data transfer as a host at the host operation; and a peripheral controller performing a data transfer as a peripheral at the peripheral operation.

4. Operation

Next, an overview of the operation of the data transfer control device of the exemplary embodiment will be explained. In this exemplary embodiment, the transfer controller 10 in the type-A plug connected side (type-A device side) transmits a switching request packet of the VBUS power supply to the data transfer control device (the transfer controller 50) in the type-B plug connected side (type-B device side) when the VBUS power supply is switched. If the transfer controller 10 receives the switching acknowledgment packet of the VBUS power supply from the data transfer control device (the transfer controller 50) in the type-B plug connected side, the transfer controller 10 indicates the power supply switch circuit 30 to stop the VBUS power supply.

Specifically, the transceiver 12, the SIE 14, or the like in the transfer controller 10 perform transmitting the switching request packet or receiving the switching acknowledgment packet of example, by a control transfer of the USB. Then, if the switching acknowledgment packet is received, the VBUS controller 18 causes the switching signal SSA to be inactive so as to turn off the switching element SA. This leads the type-A plug connected side to stop the VBUS power supply. These series of negotiation processes is performed under the control of the negotiation unit 22.

In the contrast, the transfer controller 50 in the type-B plug connected side receives the switching request packet of the VBUS power supply from the data transfer control device (the transfer controller 10) in the type-A device side. If the switching of the VBUS power supply is acknowledged, the transfer controller 50 transmits the switching acknowledgment packet of the VBUS power supply to the data transfer control device (the transfer controller 10) in the type-A plug connected side. Then, the transfer controller 50 indicates the power supply switch circuit 70 to start the VBUS power supply.

Specifically, the transceiver 52, the SIE 54, and the like in the transfer controller 50 perform receiving the switching request packet or transmitting the switching acknowledgment packet of example, by the control transfer of the USB. If the switching for the VBUS power supply is acknowledged, the VBUS controller 58 causes the switching signal SSB to be active so as to turn on the switching element SB. This leads the type-B plug connected side to start the VBUS power supply. These series of negotiation processes can be performed under the control of the negotiation unit 62.

In this way, in the exemplary embodiment, the switching of the VBUS power supply from the type-A plug connected side to the type-B plug connected side is successfully performed. As shown in FIG. 2(B), this makes it possible that the printer 310 to which the type-B plug is connected can perform the VBUS power supply to the digital camera 300 to which the type-A plug is connected. Thus, if the printer 310 includes an AC power supply, the printer 310 can perform the VBUS power supply to the digital camera 300 driven by the battery using the AC power supply, enabling the running out of the battery power in the digital camera 300 to be suppressed.

In addition, such switching of the VBUS power supply can be achieved by the negotiation process using a packet transfer. Thus, since the switching of the VBUS power supply can be performed while confirming whether or not the electronic equipment to be connected includes an AC power supply, safety and reliable switching of the VBUS power supply can be achieved. Also, this can have an advantage that the change of the VBUS power supply can be achieved by only assembling the firmware or application programs or the like for switching the VBUS power supply to the data transfer control device. The switching request or acknowledged of the VBUS power supply can be transmitted by other methods (for example, using the change of a voltage level in data lines or the like) in addition to the packet transfer.

Next, the details of the operation of the data transfer control device of the embodiment will be explained with reference to flow charts shown in FIGS. 4 through 7 and state transition diagrams shown in FIGS. 8 and 9.

Figure 4:
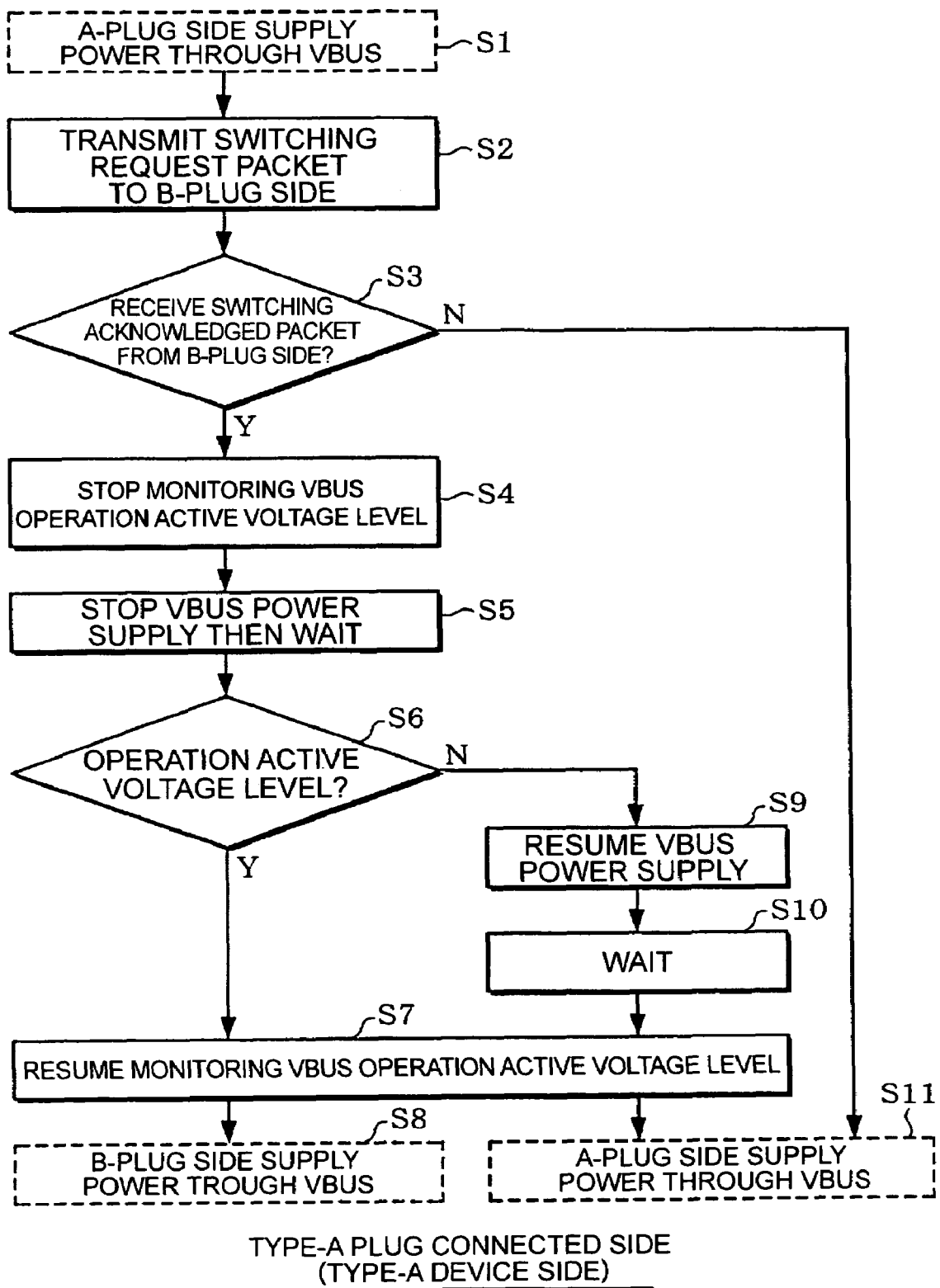
FIG. 4 is a flowchart illustrating an exemplary operation of the data transfer control device at a type-A plug connected side.
Figure 5:
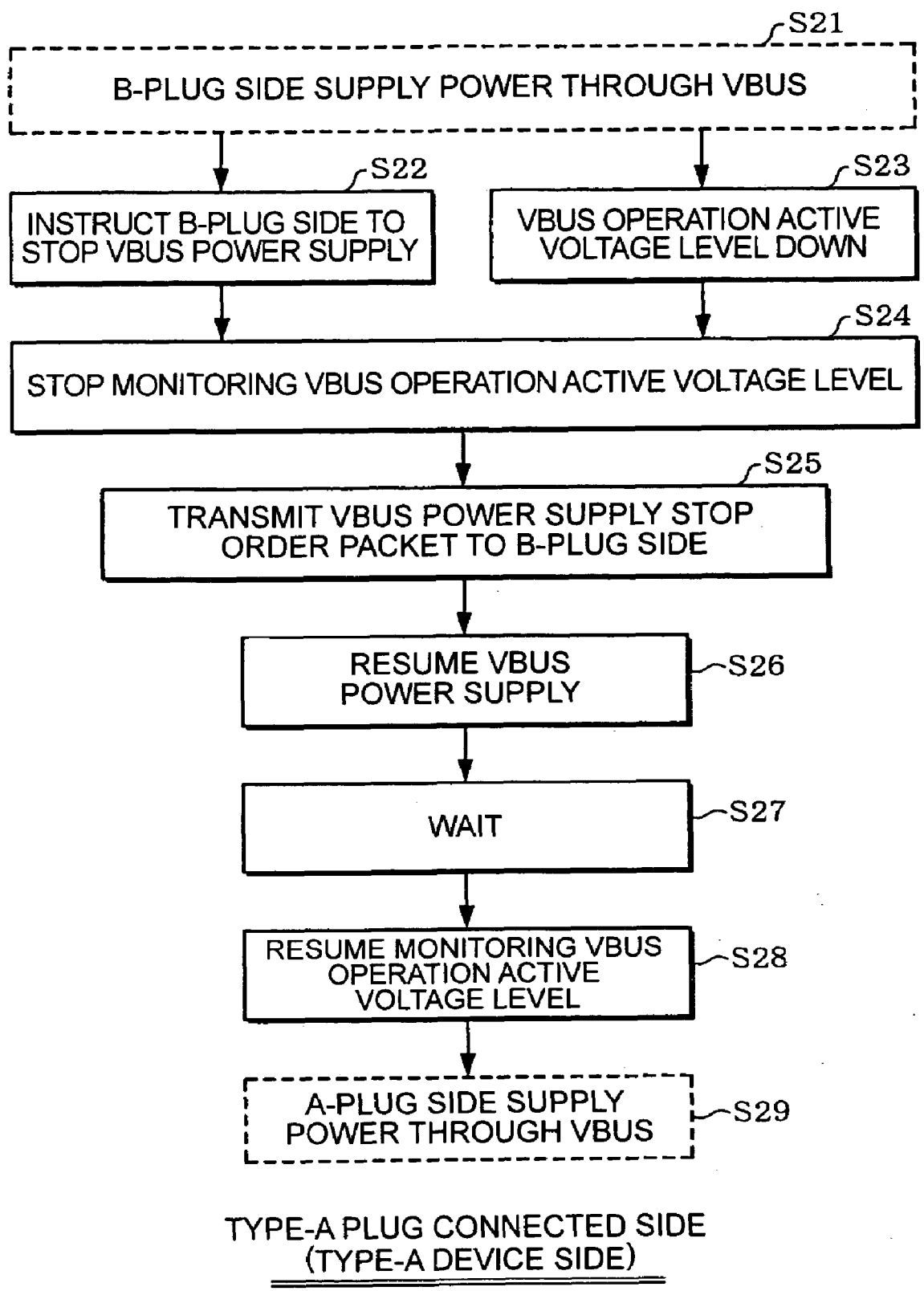
FIG. 5 is a flowchart illustrating an exemplary operation of the data transfer control device at a type-A plug connected side.

FIGS. 4 and 5 are the flow charts illustrating operation steps of the data transfer control device in the type-A plug connected side. Firstly, in the condition in which the type-A plug connected side performs the VBUS power supply (step S1), the switching request packet of the VBUS power supply is transmitted to the type-B plug connected side (step S2). Then, if the switching acknowledgment packet is received from the type-B plug connected side (step S3), the monitoring of the operation active voltage level of the VBUS is stopped (step S4). In other words, the monitoring circuit 40 is instructed to stop monitoring the voltage level of the VBUS.

Next, the VBUS power supply is stopped, and then a waiting process for stabilizing the voltage level of the VBUS is performed (step S5). In other words, the power supply switching circuit 30 can be instructed to stop the VBUS power supply (the switching element SA is turned off). Also, in order to wait until the voltage level of the VBUS is stabilized, the process is waited for given time. Then, after passing the given time, if the voltage level of the VBUS reaches the operation active voltage level (step S6), the monitoring of the operation active voltage level is resumed (step S7).

That is, the monitoring circuit 40 is instructed to resume monitoring the voltage level of the VBUS. In this way, the condition in which the type-B plug connected side performs the VBUS power supply is achieved (step S8).

In the contrast, after passing the given time, if the voltage level of the VBUS does not reach the operation active voltage level (step S6), the type-A plug connected side resumes the VBUS power supply (step S9). In other words, the power supply switching circuit 30 is instructed to resume the VBUS power supply (the switching element SA is turned on). Then, in order to wait the voltage level of the VBUS, the process is waited for given time (step S10), and then, the monitoring of the operation active voltage level is resumed (step S7). In this way, the condition in which the type-A plug connected side performs the VBUS power supply is achieved (step S11).

As shown in FIG. 4, in this exemplary embodiment, the monitoring of the voltage level of the VBUS is stopped before stopping the VBUS power supply (step S4 and step S5). The waiting process is performed after stopping the VBUS power supply, and subsequently, the monitoring of the voltage level of the VBUS is resumed (steps 5, 6, and 7).

If the type-A plug connected side stops the VBUS power supply in order to switch the VBUS power supply, the voltage level of the VBUS becomes unstable during period until the type-B plug connected side normally performs the VBUS power supply. In this time, if the monitoring the voltage level of the VBUS is performed as usual, there is a potential that an abnormal state of the voltage level of the VBUS is mistakenly detected.

Therefore, in this exemplary embodiment, the monitoring the voltage level of the VBUS is stopped before stopping the VBUS power supply. This makes it possible to prevent or reduce the abnormal state of the voltage level of the VBUS from being mistakenly detected. In addition, in the exemplary embodiment, the monitoring of the voltage level of the VBUS is resumed after the waiting process. This makes it possible to correctly monitor whether or not the type-B plug connected side normally performs the VBUS power supply. By doing this, in the exemplary embodiment, the requirement of the USB standard regarding the voltage level of the VBUS is successfully achieved while realizing the switching of the VBUS power supply.

Next, the flow chart shown in FIG. 5 illustrating the operation will be explained. In the condition in which the type-B plug connected side performs the VBUS power supply (step S21), if the power supply from the type-B plug connected side is instructed to stop by an upper layer (application layer or the like)(step S22) or if the operation active voltage level of the VBUS is down (step S23), the abnormality of the operation voltage level of the VBUS is detected, and then the monitoring the operation active voltage level is stopped (step S24). That is, the monitoring circuit 40 is instructed to stop monitoring the voltage level of the VBUS.

Next, a stop order packet of the VBUS power supply is transmitted to the type-B plug connected side (step S25), and then the type-A plug connected side resumes the VBUS power supply (step S26). That is, the power supply switching circuit 30 is instructed to resume the VBUS power supply after issuing the stop order of the VBUS power supply. Then, in order to wait until the voltage level of the VBUS is stabilized, the process is waited (step S27). Subsequently, the monitoring of the operation active voltage level of the VBUS is resumed (step S28). In other words, the monitoring circuit 40 is instructed to resume monitoring the voltage level of the VBUS. In this way, the condition in which the type-A plug connected side performs the VBUS power supply is achieved (step S29).

In this exemplary embodiment, if an upper layer instructs to stop the VBUS power supply from the type-B plug connected side or if the voltage level of the VBUS is smaller than the operation active voltage level, the stop order packet of the VBUS power supply is transmitted to the type-B plug connected side (steps S22, S23, and S25). Then, the type-A plug connected side resumes the VBUS power supply (step S26).

By doing this, if necessity to stop supplying power from the type-B plug connected side occurs in application programs or firmware or the like, or if the voltage level of the VBUS becomes abnormal state, the VBUS power supply from the type-B plug connected side can be stopped and the VBUS power supply from the type-A plug connected side can be resumed. Therefore, if an abnormal state occurs in the VBUS power supply from the type-B plug connected side, the abnormal state can be avoided by the VBUS power supply from the type-A plug connected side. In addition, for example, in the case when the battery in the type-B plug connected side is drained out because the type-B plug connected side performs the VBUS power supply, it is possible that the battery in the type-A plug connected side performs the VBUS power supply after stopping the VBUS power supply from the type-B plug connected side with instructions from application programs in the type-A plug connected side.

In addition, in this exemplary embodiment, the monitoring the voltage level of the VBUS is stopped before resuming the VBUS power supply (steps S24 and S26). The waiting process is performed after resuming the VBUS power supply, and subsequently, the monitoring of the voltage level of the VBUS is resumed (steps 26, 27, and 28). In this way, the monitoring of the voltage level of the VBUS is stopped before stopping the VBUS power supply. This makes it possible to prevent the abnormal state of the voltage level of the VBUS from being mistakenly detected. In addition, the monitoring of the voltage level of the VBUS is resumed after the waiting process. This makes it possible to correctly monitor whether or not the type-B plug connected side normally performs the VBUS power supply.

Figure 6:
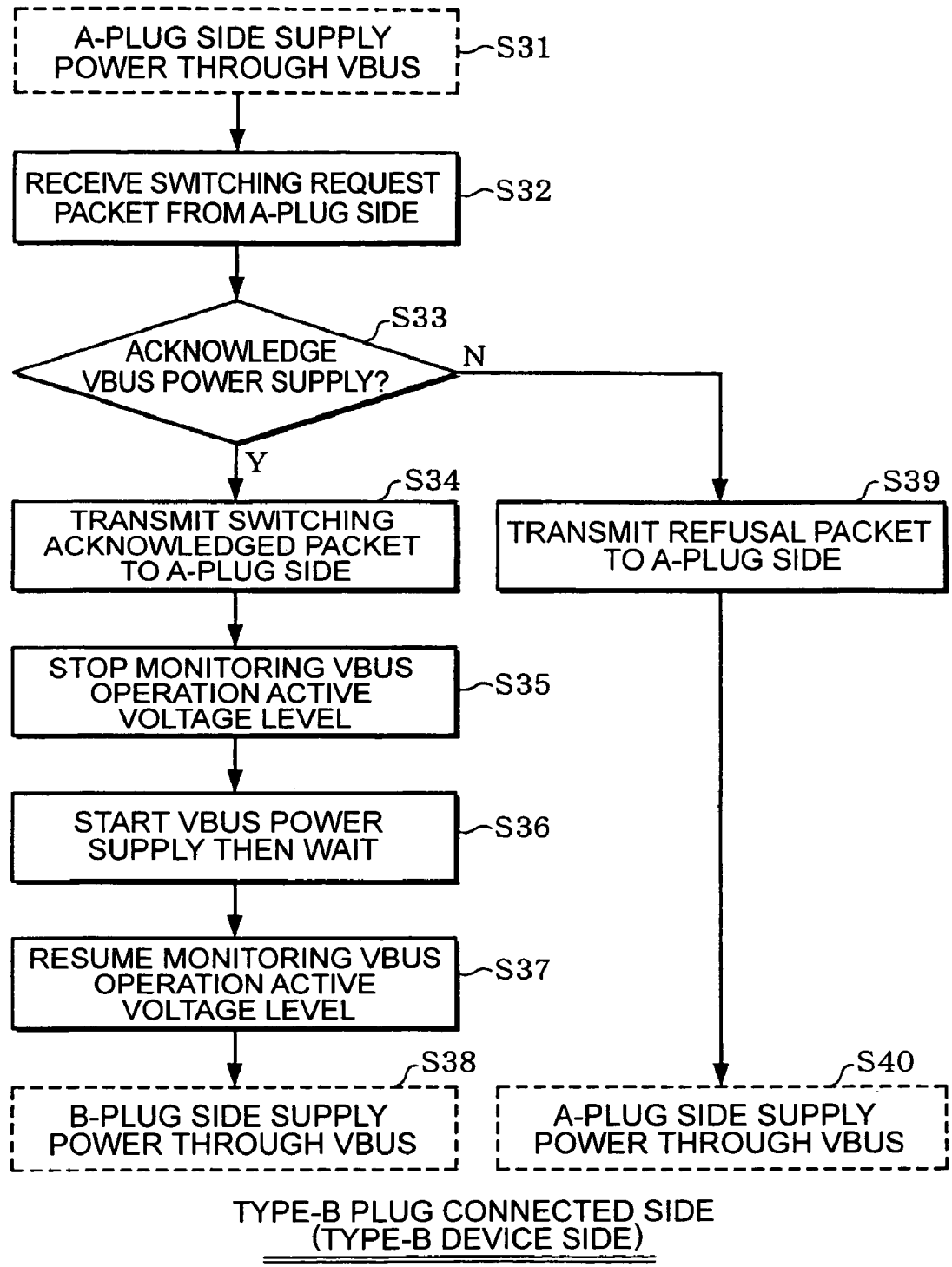
FIG. 6 is a flowchart illustrating an exemplary operation of the data transfer control device at a type-B plug connected side.
Figure 7:
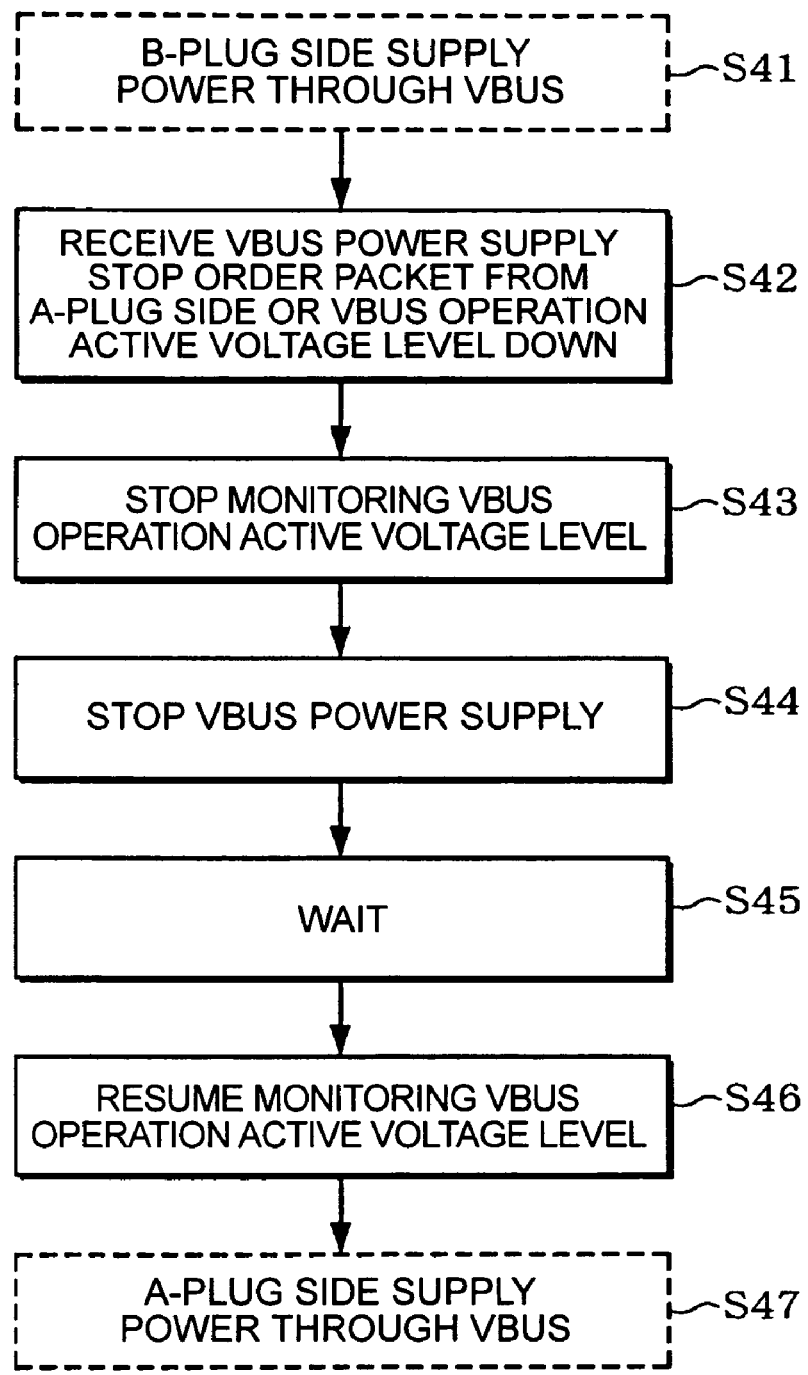
FIG. 7 is a flowchart illustrating an exemplary operation of the data transfer control device at a type-B plug connected side.

FIGS. 6 and 7 are the flow charts illustrating operation steps of the data transfer control device in the type-B plug connected side. Firstly, in the condition in which the type-A plug connected side performs the VBUS power supply (step S1), the switching request packet of the VBUS power supply is received from the type-A plug connected side (step S2).

Then, if the type-B plug connected side acknowledges the VBUS power supply (step S33), the switching acknowledgment packet is transmitted to the type-A plug connected side (step S34).

Next, the monitoring of the operation active voltage level of the VBUS is stopped (step S35). In other words, the monitoring circuit 80 is instructed to stop monitoring the voltage level of the VBUS. Then, the type-B plug connected side starts the VBUS power supply, and then a waiting process for stabilizing the voltage level of the VBUS is performed (step S36). That is, the power supply switching circuit 70 is instructed to start the VBUS power supply (the switching element SB is turned on). Also, in order to wait until the voltage level of the VBUS is stabilized, the process is waited for given time. After passing the given time, the monitoring of the operation active voltage level is resumed (step S37). That is, the monitoring circuit 80 is instructed to resume monitoring the voltage level of the VBUS. In this way, the condition in which the type-B plug connected side performs the VBUS power supply is achieved (step S38).

In the contrast, if the type-B plug connected side does not acknowledge the VBUS power supply (step S33), a switching refusal packet is transmitted to the type-A plug connected side (step S39). In this way, the condition in which the type-A plug connected side performs the VBUS power supply is achieved (step S40).

As shown in FIG. 6, in this exemplary embodiment, the monitoring of the voltage level of the VBUS is stopped before stopping the VBUS power supply (step S35 and step S36). The waiting process is performed after starting the VBUS power supply, and subsequently, the monitoring of the voltage level of the VBUS is resumed (steps S36 and 37). In this way, the monitoring the voltage level of the VBUS is stopped before starting the VBUS power supply. This makes it possible to prevent the abnormal state of the voltage level of the VBUS from being mistakenly detected. In addition, the monitoring of the voltage level of the VBUS is resumed after the waiting process. This makes it possible to correctly monitor whether or not the type-B plug connected side normally performs the VBUS power supply.

Next, the flow chart shown in FIG. 7 illustrating the operation will be explained. In the condition in which the type-B plug connected side performs the VBUS power supply (step S41), if the stop order of supplying power from the type-A plug connected side is received, or if the operation active voltage level of the VBUS is down (step S42), the monitoring of the operation active voltage level of the VBUS is stopped (step S43). In other words, the monitoring circuit 80 is instructed to stop monitoring the voltage level of the VBUS. Then, the type-B plug connected side stops the VBUS power supply (step S44). That is, the power supply switching circuit 70 is instructed to stop the VBUS power supply.

Next, in order to wait until the voltage level of the VBUS is stabilized, the process is waited (step S45). Subsequently, the monitoring the operation active voltage level of the VBUS is resumed (step S46). That is, the monitoring circuit 80 is instructed to resume monitoring the voltage level of the VBUS. In this way, the condition in which the type-A plug connected side performs the VBUS power supply is achieved (step S47).

In this exemplary embodiment, if the stop order of the VBUS power supply is received from the type-A plug connected side, or if the voltage level of the VBUS is smaller than the operation active voltage level, the VBUS power supply is stopped (steps S42 and S44). By doing this, if necessity to stop supplying power from the type-B plug connected side occurs in application programs or firmware or the like in the type-A plug connected side, or if the voltage level of the VBUS becomes abnormal state, the VBUS power supply from the type-B plug connected side can be stopped. In this way, the avoidance of abnormal cases or the like in the VBUS power supply performed by the type-B plug connected side can be achieved.

In addition, in this exemplary embodiment, the monitoring the voltage level of the VBUS is stopped before stopping the VBUS power supply (steps S43 and S44). The waiting process is performed after stopping the VBUS power supply, and subsequently, the monitoring of the voltage level of the VBUS is resumed (steps S44, S45, and S46). In this way, the monitoring the voltage level of the VBUS is stopped before stopping the VBUS power supply. This makes it possible to prevent the abnormal state of the voltage level of the VBUS from being mistakenly detected. In addition, the monitoring of the voltage level of the VBUS is resumed after the waiting process. This makes it possible to correctly monitor whether or not the type-A plug connected side normally performs the VBUS power supply.

Figure 8:
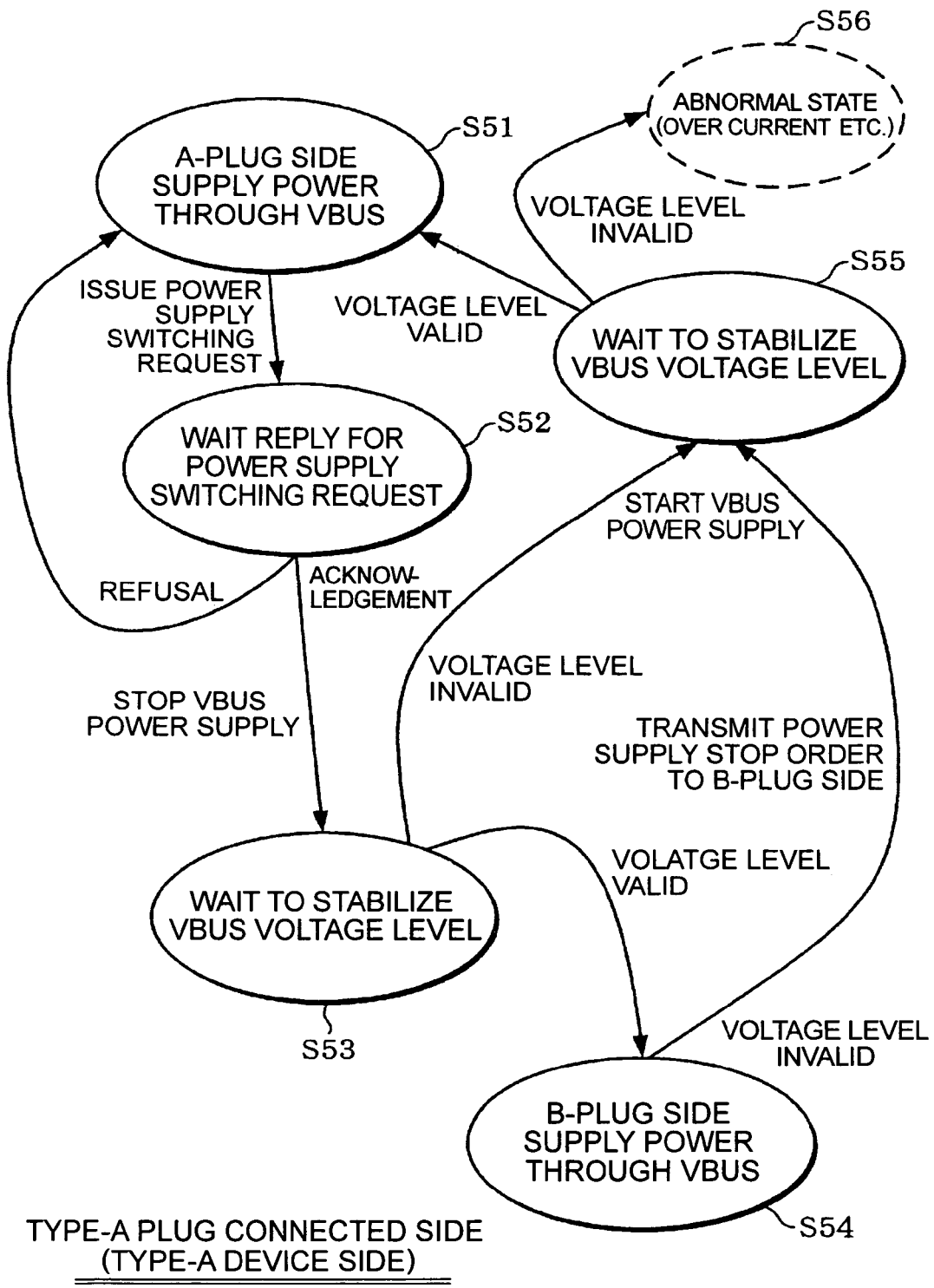
FIG. 8 is a state transition diagram of the data transfer control device at a type-A plug connected side.

FIG. 8 shows a state transition diagram illustrating the operation of the type-A plug connected side. Firstly, in the condition in which the type-A plug connected side performs the VBUS power supply (state S51), if the switching request for supplying power is issued, a reply for the switching request for supplying power from the type-B plug connected side is waited (state S52). If the reply of refusal is received, the type-A plug connected side continues the VBUS power supply (sate S51). In the contrast, if the reply of acknowledge is received, the type-A plug connected side stops the VBUS power supply, and then the type-A plug connected side waits until the voltage level of the VBUS is stabilized by supplying power from the type-B plug connected side (state S53). Then, if the voltage level of the VBUS is valid, the condition in which the type-B plug connected side performs the VBUS power supply is achieved (state S54).

In the contrast, if the voltage level of the VBUS is invalid in the states S53 and S54, the type-A plug connected side starts the VBUS power supply and waits until the voltage level of the VBUS is stabilized by supplying power from the type-A plug connected side (state S55). If the voltage level of the VBUS is invalid, it is determined that the condition is an abnormal state (state S56). In the contrast, if the voltage level of the VBUS is valid, the condition in which the type-B plug connected side performs the VBUS power supply is achieved (state S51).

Figure 9:
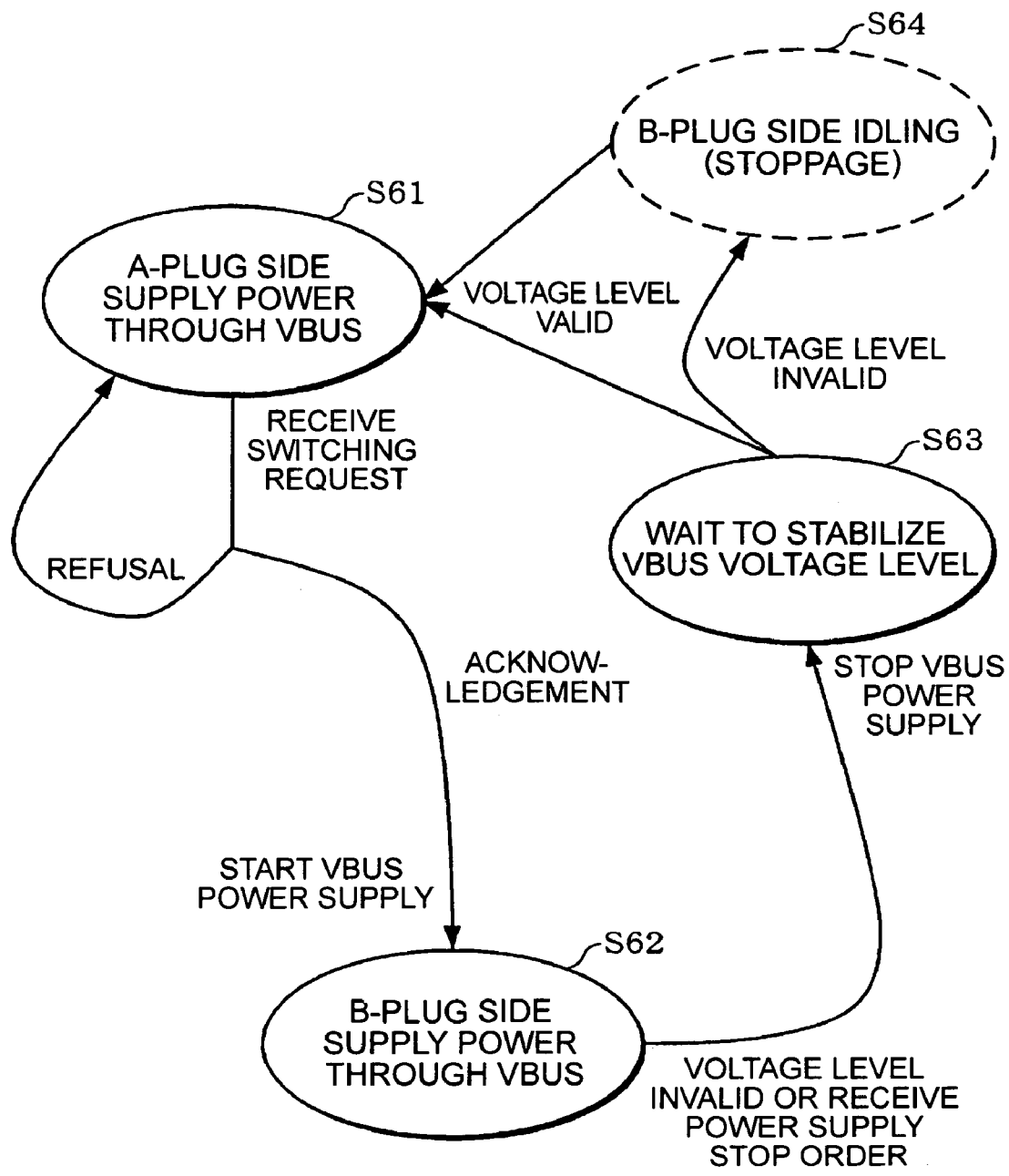
FIG. 9 is a state transition diagram of the data transfer control device at a type-B plug connected side.

FIG. 9 shows a state transition diagram illustrating the operation of the type-B plug connected side. Firstly, in the condition in which the type-A plug connected side performs the VBUS power supply (state S61), the switching request for the VBUS power supply is received from the type-A plug connected side. If the type-B plug connected side acknowledges it to start the VBUS power supply, the condition in which the type-B plug connected side performs the VBUS power supply is achieved (state S62). In the contrast, if the type-B plug connected side refuses the switching request for supplying power, the type-A plug connected side continues the VBUS power supply (sate S61).

In the condition in which the type-B plug connected side performs the VBUS power supply (state 62), if the voltage level of the VBUS is non valid, or if the stop order of the VBUS power supply is received from the type-A plug connected side, the VBUS power supply is stopped, and then the type-B plug connected side waits until the voltage level of the VBUS is stabilized (state S63). If the voltage level of the VBUS is valid, the condition in which the type-A plug connected side performs the VBUS power supply is achieved (state S61). In the contrast, if the voltage level of the VBUS is invalid, the condition in which the type-B plug connected side is in an idle state (operation is stopped) (state S64).

5. Usage of the Control Transfer

The transmission of the switching request packet or switching acknowledgment packet of the VBUS power supply can be performed using the control transfer of the USB.

Figure 10:
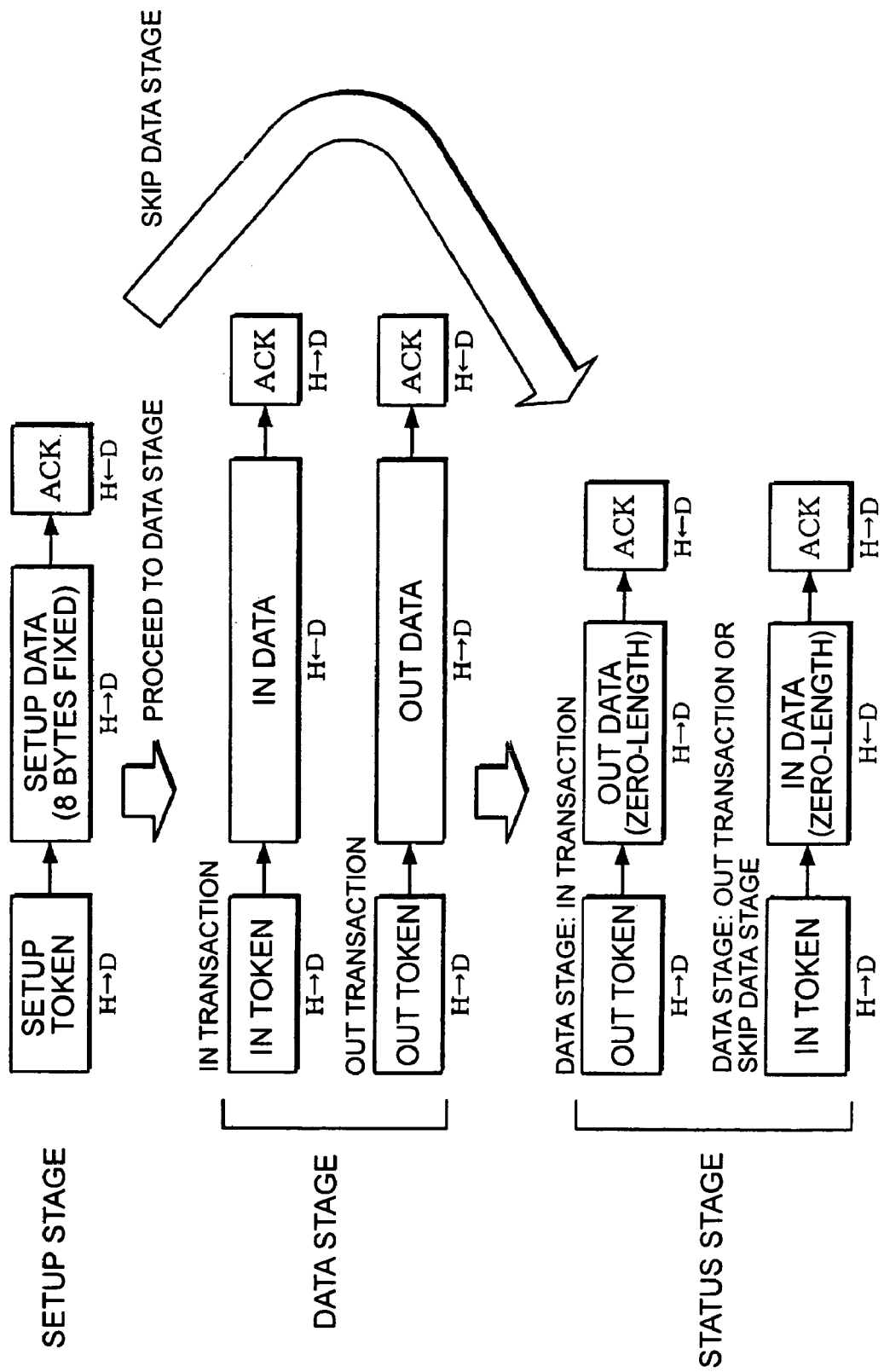
FIG. 10 is a diagram explaining a control transfer of the USB.

FIG. 10 is a frame format showing the control transfer of the USB. In FIG. 10, "H→D" means that a packet is transferred to a USB device (target or peripheral) from a host. "H←D" means that a packet is transferred to a host from a USB device. Usually, in the USB, the type-A plug connected side is the host and the type-B plug connected side is the USB device. However, in the OTG, by switching the role of the host and the USB device (peripheral) through the host negotiation protocol (HNP), the type-A device as the type-A plug connected side can become the USB device. Also, the type-B device as the type-B plug connected side can become the host.

The control transfer can be the transfer mode for control performed between the host and USB device through a control end point, whose number of endpoint is zero. As shown in FIG. 10, the control transfer is configured by the following stages. A setup stage in which the host sends a device request to the USB device, a data stage in which data is transferred in the transfer direction designated by the device request, and a status stage in which whether or not the data transfer is successfully performed is notified.

In the setup stage of the control transfer, the host (H) produces a SETUP token packet so as to transmit it to the USB device (D). Next, the host transmits the packet of SETUP data including the device request to the USB device. The USB device, which receives the SETUP data packet, transmits a handshake packet of an acknowledgement (ACK) to the host. Received the handshake packet of the acknowledgement from the USB device, the host completes the setup stage. Upon completion of the setup stage, the data stage is followed. For the device request including no data stage, the status stage is followed by skipping the data stage.

For the device request in which the transfer direction in the data stage is "IN", the host produces an IN transaction in the data stage such that the USB device transmits data to the host. In the contrast, for the device request in which the transfer direction in the data stage is "OUT", the host produces an OUT transaction in the data stage such that the host transmits data to the USB device. Upon completion of the data stage, the status stage is followed.

In the status stage, if the IN transaction has been produced in the data stage, the host issues an OUT token such that the host transmits the packet of zero-length OUT data to the USB device. In the contrast, if the OUT transaction has been produced in the data stage, the host issues an IN token such that the USB device transmits the packet of zero-length IN data to the host.

For example, if the switching request packet is transmitted, the host, which is the type-A plug connected side, includes the data notifying the switching request in the OUT data so as to transmit the data to the USB device, which is the type-B plug connected side. In other words, the switching request packet is transmitted by the OUT data packet. Alternatively, if the switching acknowledgment packet is transmitted, the USB device, which is the type-B plug connected side, includes the data notifying the switching acknowledged in the IN data so as to transmit the data to the host, which is the type-A plug connected side. That is, the switching acknowledgment packet is transmitted by the IN data packet.

Also, if, by interchanging the role of the host and peripheral (USB device) in the OTG, the type-A device, which is the type-A plug connected side, becomes the peripheral, and the type-B device, which is the type-B plug connected side, becomes the host, the switching request packet is transmitted by the IN data packet, and the switching acknowledgment packet is transmitted by the OUT data packet.

If the type-A device (the type-A plug connected side) becomes the peripheral, and the type-B device (the type-B plug connected side) becomes the host using HNP of the OTG, the token can be issued only by the type-B device, which is the host. Also, in the negotiation method of the exemplary embodiment, it is based on the premise that the negotiation is started on the initiative of the type-A device. As above-mentioned, the negotiation of the VBUS needs to be performed when the type-A device becomes the host.

In this case, the type-A device is always allowed to operate as the host according to the regulations of the OTG. In other words, even if the type-A device becomes peripheral through the HNP, the type-A device can always resume a host operation right (right to operate as the host). Therefore, if the type-A device operates as a peripheral using HNP, the type-A device performs the negotiation of the VBUS (negotiation to switch the VBUS power supply) using the method of the exemplary embodiment once the type-A device resumes the host operation right through the HNP. After that, the type-A device resumes back to a peripheral operation mode again through the HNP.

The transmission of the switching request packet or switching acknowledgment packet using the control transfer as above mentioned has an advantage that the switching for the VBUS power supply can safely and reliably be performed.

6. Electronic Equipment

Figure 11:
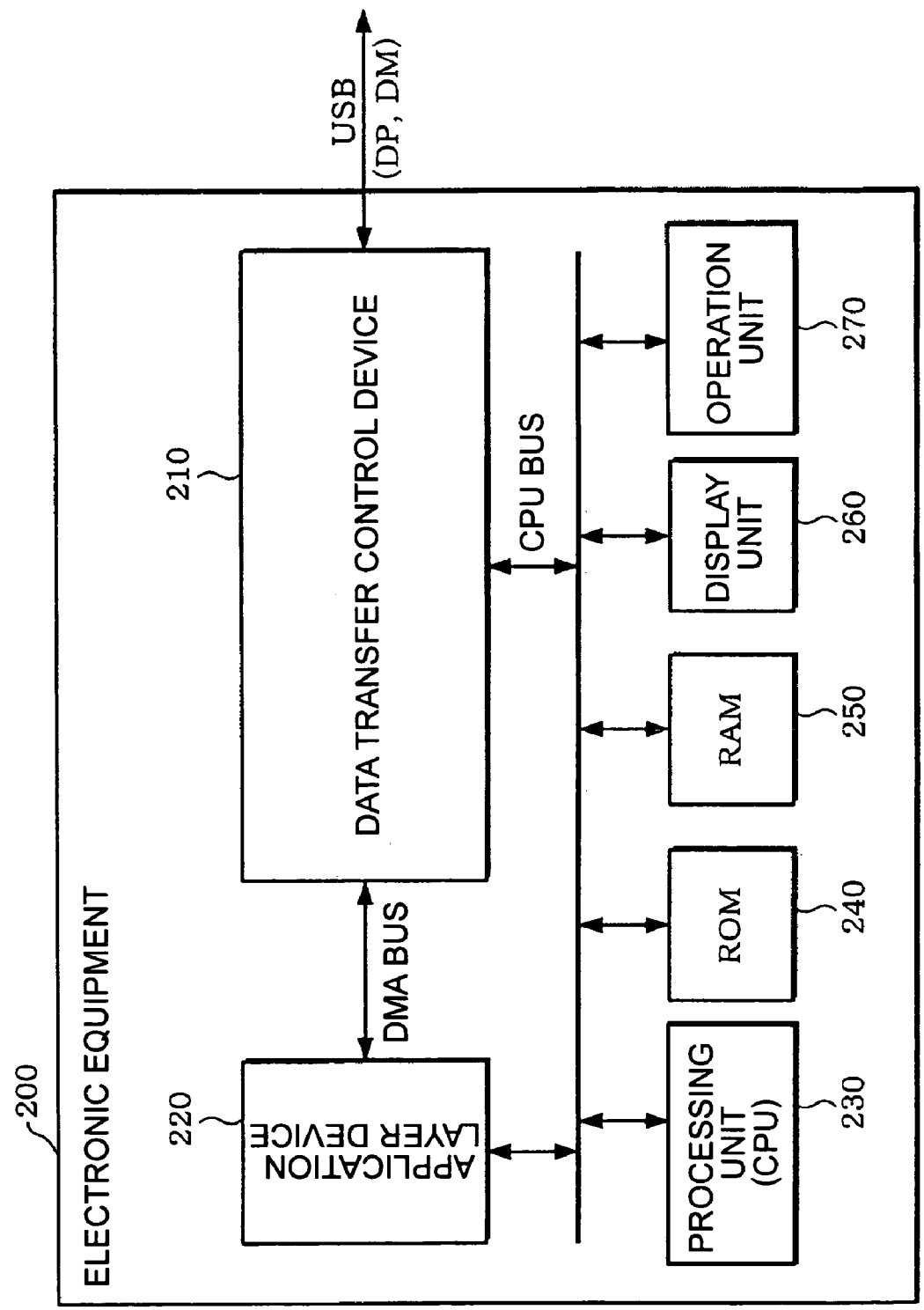
FIG. 11 shows an exemplary of the configuration of electronic equipment.

FIG. 11 shows an example of the configuration of electronic equipment including a data transfer control device of the exemplary embodiment. Electronic equipment 200 includes a data transfer control device 210 explained in the above exemplary embodiment, an application layer device 220 including an ASIC and the like, a CPU 230, a ROM 240, a RAM 250, a display unit 260, and an operation unit 270. A configuration in which a part of these function (circuit) blocks is omitted can be used.

Here, the application layer device 220 includes, for example, a hard disk drive, an optical disk drive, a device controlling printers, a MPEG encoder, a MPEG decoder, or the like. The processing unit (CPU) 230 controls the data transfer control device 210 and the entire electronic equipment. The ROM 240 stores control programs and various kinds of data. The RAM 250 functions as a work region and a data storage region of the processing unit 230 and the data transfer control device 210. The display unit 260 displays various kinds of information to users. The operation unit 270 is for operating the electronic equipment by a user.

In FIG. 11, a DMA bus and a CPU bus are separated. However, they can be used in common. Also, a processing unit to control the data transfer control device 210 and a processing unit to control the electronic equipment can be individually provided. In addition, for the electronic equipment to which the embodiment can be applied, optical disk drives (CD-ROM or DVD), magneto optical disk drives (MO), hard disk drives, TVs, TV tuners, VTRs, video cameras, audio equipment, telephones, projectors, personal computers, personal digital assistants, word processors, and the like are exemplified.

Here, it should be understood that the invention is not limited to the exemplary embodiment, can also be but applied to various kinds of modifications within the scope and spirit of the invention.

For example, the configuration of the data transfer control device of the present invention is not limited to the configuration explained in FIG. 3 and the like but applied to various kinds of modifications. Also, the operation of the data transfer control device of the invention is not limited to the operation explained in FIGS. 4 through 9, and the like.

In addition, terms referred as a broad term or an equivalent term (type-A plug connected side or type-B plug connected side or the like) in the specification and drawings can be replaced to a broad term or an equivalent term (type-A device side or type-B device side or the like) in other descriptions in the specification and drawings.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A data transfer control device for transferring data through a USB, comprising:
    a transfer controller that controls a data transfer; and
    a power supply switching circuit that controls a switching of supplying power to a VBUS line of the USB,
    when the data transfer control device is a first data transfer control device connected to a type-A plug side of the USB and supplies power to the VBUS line, the transfer controller transmits a switching request packet of supplying power to a second data transfer control device connected to a type-B plug side of the USB, the switching request packet of supplying power containing a request to switch the supplying of power to the VBUS line to the second data transfer control device; and
    if the transfer controller receives a switching acknowledgment packet of supplying power from the second data transfer control device connected to the type-B plug side, then the transfer controller instructs the power supply switching circuit to stop supplying power to the VBUS line, wherein the supplying of the power to the VBUS line is switched from the first data transfer control device connected to the type-A plug side of the USB to the second data transfer control device connected to the type-B plug side of the USB.

2. The data transfer control device according to claim 1, further comprising:
    a monitoring circuit that monitors a voltage level on the VBUS line,
    the transfer controller instructing the monitoring circuit to stop monitoring the voltage level on the VBUS line before instructing the power supply switching circuit to stop supplying power to the VBUS line.

3. The data transfer control device according to claim 2, the transfer controller:
    instructing the power supply switching circuit to stop supplying power to the VBUS line;
    performing a waiting process; and
    instructing the monitoring circuit to resume monitoring the voltage level on the VBUS line.

4. The data transfer control device according to claim 1, when the second data transfer control device connected to the type-B plug side supplies power to the VBUS line, and
    if a stoppage of supplying power to the VBUS line from the second data transfer control device is instructed by an upper layer or if the voltage level on the VBUS line is smaller than an operation active voltage level, the transfer controller transmits a stop order packet of supplying power on the VBUS line to the second data transfer control device connected to the type-B plug side and instructs the power supply switching circuit to resume supplying power to the VBUS line.

5. The data transfer control device according to claim 4, further comprising:
    a monitoring circuit that monitors the voltage level on the VBUS line,
    the transfer controller instructing the monitoring circuit to stop monitoring the voltage level on the VBUS line before instructing the power supply switching circuit to resume supplying power to the VBUS line.

6. The data transfer control device according to claim 5, the transfer controller:
    instructing the power supply switching circuit to resume supplying power on the VBUS line;
    performing a waiting process; and
    instructing the monitoring circuit to resume monitoring the voltage level on the VBUS line.

7. The data transfer control device according to claim 1, the transfer controller transmitting the switching request packet using a control transfer based on the USB specification.

8. A data transfer control device for transferring data through a USB, comprising:
    a transfer controller that controls a data transfer;
    a power supply switching circuit controlling a switching of supplying power to a VBUS line of the USB,
    when the data transfer control device is a second data transfer control device connected to a type-B plug side of the USB and power to the VBUS line is supplied by a first data transfer control device connected to a type-A side of the USB;
    if the transfer controller receives a switching request packet of supplying power to the VBUS line from the first data transfer control device connected to the type-A plug side, the switching request packet of supplying power contains a request that the second data transfer control device supply power to the VBUS line, then the transfer controller transmits a switching acknowledgment packet of supplying power to the VBUS line to the first data transfer control device connected to the type-A plug side and instructs the power supply switching circuit to start supplying power to the VBUS line, wherein the supplying of the power to the VBUS line is switched from the first data transfer control device connected to the type-A plug side of the USB to the second data transfer control device connected to the type-B plug side of the USB.

9. The data transfer control device according to claim 8, further comprising:
    a monitoring circuit that monitors a voltage level on VBUS line,
    the transfer controller instructing the monitoring circuit to stop monitoring the voltage level on the VBUS line before instructing the power supply switching circuit to start supplying power to the VBUS line.

10. The data transfer control device according to claim 9, the transfer controller:
    instructing the power supply switching circuit to start supplying power to the VBUS line;
    performing a waiting process; and instructing the monitoring circuit to resume monitoring the voltage level on the VBUS line.

11. The data transfer control device according to claim 8, when the data transfer control device is the second data transfer control device connected to the type-B plug side that supplies power to the VBUS line, if a stop order packet of supplying power to the VBUS line is received from the first data transfer control device connected to the type-A plug side, or if the voltage level on the VBUS line is smaller than an operation active voltage level, then the transfer controller instructs the power supply switching circuit to stop supplying power to the VBUS line.

12. The data transfer control device according to claim 11, further comprising:
   a monitoring circuit that monitors the voltage level on the VBUS line,
   the transfer controller instructing the monitoring circuit to stop monitoring the voltage level on the VBUS line before instructing the power supply switching circuit to stop supplying power to the VBUS line.

13. The data transfer control device according to claim 12, the transfer controller:
   instructing the power supply switching circuit to stop supplying power to the VBUS line;
   performing a waiting process; and
   instructing the monitoring circuit to resume monitoring the voltage level on the VBUS line.

14. The data transfer control device according to claim 8, the transfer controller transmitting the switching acknowledgment packet using a control transfer based on the USB specification.

15. Electronic equipment, comprising:
   the data transfer control device according to claim 1; and
   a processing unit that controls the data transfer control device.

16. Electronic equipment, comprising:
   the data transfer control device according to claim 8; and
   a processing unit that controls the data transfer control device.

* * * * *